United States Patent [19]

Dallas

[11] Patent Number: 4,841,666
[45] Date of Patent: Jun. 27, 1989

[54] RELEASABLE FISH HOOK

[76] Inventor: Gust Dallas, 1960 Clover Rd., Northbrook, Ill. 60062

[21] Appl. No.: 268,484

[22] Filed: Nov. 8, 1988

[51] Int. Cl.$^4$ .............................................. A01K 83/00
[52] U.S. Cl. ................................................... 43/43.16
[58] Field of Search ................... 43/43.16, 43.2, 43.4, 43/17.2

[56] References Cited

U.S. PATENT DOCUMENTS

| | | | |
|---|---|---|---|
| 196,648 | 10/1877 | Edgar. | |
| 617,236 | 1/1899 | Dougherty. | |
| 1,611,544 | 6/1927 | Maurus. | |
| 2,792,664 | 6/1954 | Schwarzer | 43/43.16 |
| 2,815,603 | 12/1957 | Bandemer | 43/43.16 |
| 3,758,976 | 9/1973 | Szwolkon | 43/43.16 |
| 3,827,174 | 8/1974 | Banker | 43/43.16 |
| 3,841,014 | 10/1974 | Thomas, Jr. et al. | 43/43.16 |
| 4,068,400 | 1/1978 | McCoy | 43/53.5 |
| 4,126,957 | 11/1978 | Randall | 43/43.16 |
| 4,403,437 | 9/1983 | Shuman | 43/43.16 |
| 4,570,373 | 2/1986 | Brief | 43/43.16 |
| 4,768,304 | 9/1988 | Preiser | 43/43.16 |

Primary Examiner—M. Jordan
Attorney, Agent, or Firm—Tilton, Fallon, Lungmus & Chestnut

[57] ABSTRACT

A releasable fish hook is provided which has a simple construction and which allows the user to catch fish and release them while minimizing any harm to them. This fish hook includes a stem member suspended from the distal end of a fishing line, a hook member for penetrating the fish body, and an anchoring assembly for releasably securing the hook member to the stem member, holding the hook member in a locked position with the stem member and releasing the hook member to an unlocked position, separated from the stem member.

5 Claims, 1 Drawing Sheet

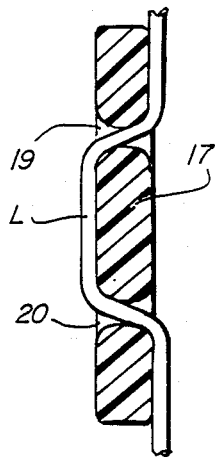
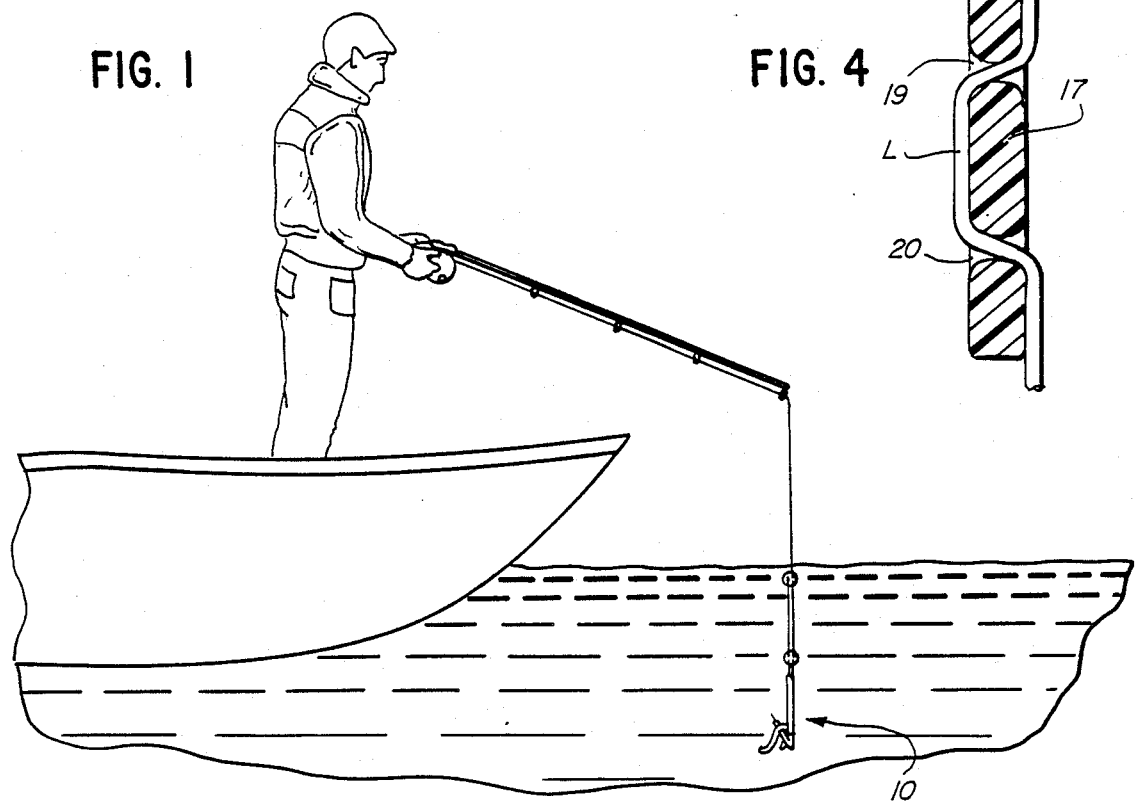
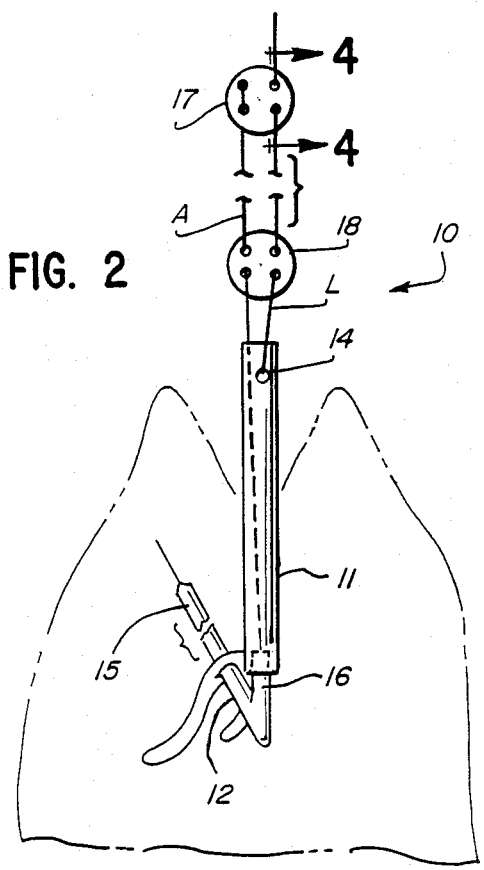
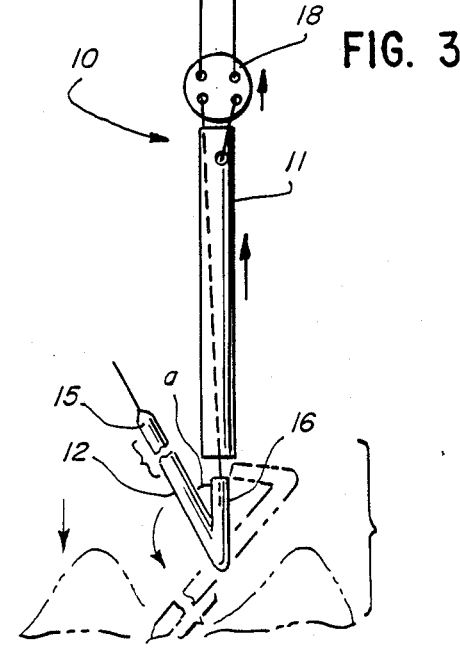

RELEASABLE FISH HOOK

BACKGROUND OF THE INVENTION

1. Field Of The Invention

The present invention generally relates to a fish hook, and more specifically to a releasable fish hook which allows the user to quickly and easily remove it from a fish and minimize injury to the fish.

2. Description Of The Prior Art

An increasing number of people fish purely for recreation and do not keep the fish they catch. Out of a growing sensitivity for wildlike preservation, many of these people also want to avoid injury to the fish. Consequently, the demand for fishing implements with which a user can catch fish and release them without injury has increased. The implement which causes the most injury to a fish is, of course, the fish hook. Typically, a fish hook is a rigid, metal device which has a curved configuration and a sharp, barbed end. The barb locks the hook into the body of the fish and makes it difficult to remove the hook without causing injury to the fish. To release a fish from the hook, a fisherman must also handle the fish, causing additional injury to it.

The prior art includes a number of releasable fish hooks. For example, U.S. Pat. No. 3,827,174 to Banker discloses a fish hook assembly including a hook end segment pivotally connected to a shank and movable between a release and a hook position. This assembly is complex and includes a number of curved and projecting segments which may cause injury to the fish.

In addition, U.S. Pat. No. 4,126,957 to Randall discloses a displacable fish hook comprising a plurality of pivotally connected segments. A user may lock these segments into a curved, rigid configuration or release them into a relaxed arrangement. This assembly includes a multitide of movable segments disposed in precise order. It is complex and susceptible to malfunction.

The releasable fish hook of the present invention avoids the problems of the prior art fish hooks. It is a simple construction which allows the user to quickly and easily release it from a fish with minimal injury to the fish. It has a small number of parts and allows for easy operation and inexpensive manufacture.

SUMMARY OF THE INVENTION

In accordance with a preferred embodiment of this invention, a releasable fish hook includes a stem member. In the preferred embodiment, this stem member is an elongate metal tube with an opening formed through its wall at a first distal end. The user passes the end of the fishing line of a rod and reel or similar fishing device through this opening and ties the stem member to the end of the fishing line. Alternatively, the stem member may be any suitable material of high strength and rigidity and have any configuration which minimizes injury to the fish.

The stem member receives a hook member at its second end. This hook member has a piercing segment with a nail or pin-like configuration for penetrating the body of the fish and a connecting segment which lies at an acute, included angle to the piercing segment. Preferably, the piercing segment is straight and has a round cross-section. However, it may have any cross-sectional configuration; and it may be curved. The connecting segment has a cross-sectional shape which coincides with the cross-sectional shape of the opening through the stem member; and it fits snugly in this opening when placed in the hook or locked position as described below. Like the stem member, the hook member is made of metal or any other material of high strength and rigidity.

An anchoring assembly connects the hook and stem members together and locks them in a hook configuration. This assembly includes an anchor line and at least one holding button formed of plastic or any other suitable material, e.g., metal, glass or wood. The button has at least two openings formed through its body for receiving the fishing line from the rod and reel. The fishing line, bent in a wave-like form, extends through these openings. When the user pulls the fishing line taut, the line section at the button flattens and the button locks onto this line. The anchor line has one end secured to the button and the other end secured to the hook member. When the user releases the line from the rod and reel, the button slides along the fishing line.

In operation, to lock the hook member to the stem member, the user inserts the connecting segment of the hook member into the stem member and pulls the anchor line taut. The user then pulls the fishing line taut to lock the button to the fishing line and secure the hook member to the stem member. He or she maintains the fishing line taut until he or she catches a fish. After catching a fish, the user releases it by providing slack in the fishing line and allowing the button to release and the hook member to separate from the stem member.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a perspective view of the releasable fish hook of the present invention in use at the end of a fishing line of a rod and reel.

FIG. 2 is a side elevation view of the releasable fish hook of FIG. 1, showing the hook in the locked or hook position.

FIG. 3 is a side elevation view of the releasable fish hook of FIG. 1, showing the hook in its unlocked position.

FIG. 4 is a sectional view taken along line 4—4 in FIG. 2.

While the following disclosure describes the invention in connection with a preferred embodiment, one should understand that the invention is not limited to this embodiment. Furthermore, one should understand that the drawings are not to scale. In certain instances the disclosure may not include details which are not necessary for an understanding of the present invention.

DETAILED DESCRIPTION OF THE DRAWINGS AND A PREFERRED EMBODIMENT

Turning now to the drawings, FIGS. 1-3 show a preferred embodiment of a releasable fish hook at 10. The fish hook generally includes a stem member 11, a hook member 12 releasably secured to the stem member, and an anchoring assembly 13 for releasably securing the stem member to the hook member. The stem member 11 is an elongate metal tube. It has an opening 14 formed through its wall at a first end for securing it to the fishing line L of a rod and reel or any other fishing device. It receives the hook member 12 in its central opening at a second, opposite end.

As stated above, the stem member 11 is preferably a metal tube. However, it may be made of any suitable material of high strength and rigidity. In addition, it may have any one of a number of alternative configurations which do not cause injury to a fish. Furthermore, rather than having the opening 14, the stem member 11 may include a flange, collar or loop made out of wire or thread to which the user may secure the fishing line L.

The hook member 12 includes a piercing segment 15 which has a round nail or pin-like configuration. It also includes a connecting segment 16 which lies at an acute, included angle "a" to the piercing segment. The connecting segment 16 has a cross-sectional shape which coincides with the cross-sectional shape of the central opening of the stem member; and it fits snugly into this opening when placed in the locked or hook position as described below. Like the stem member, the hook member is made of metal or any other material of high strength and rigidity. Moreover, the piercing segment may have any suitable cross-sectional configuration and overall shape, including one that is curved.

The anchoring assembly 13 includes an anchor line A and first and second holding buttons, 17 and 18, formed from plastic or any other suitable material, e.g., metal, glass, or wood. The anchoring line A has one end tied or otherwise secured to the button 17 and the second, opposite end to the connecting segment 16 of the hook member 12. The button 17 has two openings 19 and 20 (See FIG. 4); and the line L extends through these openings, as shown in FIG. 4, bent in a wave-like form. When the user pulls the line L taut, the line section at the button 17 flattens and the button locks onto the Line L. When the user releases the line L, the button may once again slide along line L. The button 17 and the anchor line A secure the hook member to the stem member as described below. The button 18 has two sets of openings, one set for the line L to pass through as shown in FIG. 4 and the other set for anchor line A to pass through in a similar manner. This button also provides a locking force to supplement the locking provided by the button 17.

The anchor assembly locks the hook member to the stem member 11 and allows the user to release the hook member 12 from the stem member after catching a fish. The user may release the fish from a substantial length. To lock the hook member to the stem member, the user inserts the connecting segment 16 of the hook member 12 into the central opening of the stem member 11 and pulls the anchor line A taut. The user then pulls the fishing line taut to lock the buttons 17 and 18 to the fishing line and secure the hook member 12 to the stem member 11. He or she maintains the fishing line taut until he or she catches a fish. After catching a fish, the user releases it by providing slack in the fishing line L and allowing the buttons 17 and 18 to release and the hook member 12 to separate from the stem member 11.

Thus, the present invention provides a releasable fish hook which overcomes the problems of the prior art fish hooks and which allows the user to quickly and easily remove it from a fish while minimizing injury to the fish. While the above description and the drawings illustrate one preferred embodiment, one should understand, of course, that the invention is not limited to this embodiment. Those skilled in the art to which the invention pertains may make modifications and other embodiments employing the principals of this invention, particularly upon considering the foregoing teachings.

For example, the connecting segment 16 of the hook member 12 may have a cross-section larger than the cross-section of the stem member 11 and an opening for receiving the bottom portion of the stem member 11. Therefore, by the appended claims, the applicant intends to cover any such modifications and other embodiments as incorporate those features which constitute the essential features of this invention.

I claim:

1. A releasable fish hook for use with a rod and reel or other fishing device which includes a fishing line, said fish hook comprising: a stem member disposed at the distal end of said fishing line, a hook member having a connecting segment for engaging said stem member and a main body segment for penetrating the body of a fish, and anchoring means for releasably securing the hook member to the stem member when placed in a locked position and for releasing the hook member from the stem member and allowing said hook and stem members to separate when placed in an unlocked position.

2. A releasable fish hook as in claim 1, wherein said connecting means includes button means disposed in sliding engagement on said fishing line for friction engagement with said fishing line and an anchor line secured at one end to said button means and at said opposite end to said hook member.

3. A releasable fish hook as in claim 1, wherein said stem and hook members define a hook configuration in the locked position.

4. A releasable fish hook as in claim 1, wherein said stem member defines an opening for receiving said connecting segment.

5. A releasable fish hook as in claim 2, wherein said stem member is a metal tube and said anchor line extends through it.

* * * * *